United States Patent
Bigsby

(10) Patent No.: US 6,941,634 B2
(45) Date of Patent: Sep. 13, 2005

(54) METHOD FOR ATTACHING AXLES TO A LEAF SPRINGS ON HYDRAULIC DISC BRAKE VEHICLES

(75) Inventor: Bryan D. Bigsby, Evans, GA (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 10/087,657

(22) Filed: Mar. 1, 2002

(65) Prior Publication Data

US 2003/0163911 A1 Sep. 4, 2003

(51) Int. Cl.⁷ .......................... B23P 11/00; B60G 11/02
(52) U.S. Cl. .................... 29/525.02; 267/25; 267/36.1; 267/260; 280/124.17; 280/124.175
(58) Field of Search ............................. 29/428–525.15; 267/25, 36.1, 260; 280/124.17, 124.175

(56) References Cited

U.S. PATENT DOCUMENTS

| | | | | | |
|---|---|---|---|---|---|
| 1,606,387 A | * | 11/1926 | Rowe | .................. | 280/124.175 |
| 1,903,136 A | * | 3/1933 | Reid | | |
| 2,745,661 A | * | 5/1956 | Van Raden | .................. | 267/52 |
| 2,771,303 A | * | 11/1956 | Frazier | .................... | 280/104.5 |
| 2,929,618 A | * | 3/1960 | Hutchens | ...................... | 267/30 |
| 3,194,580 A | * | 7/1965 | Hamlet | ...................... | 280/104.5 |
| 3,241,626 A | * | 3/1966 | Woodburn | .................... | 177/137 |
| 3,386,724 A | * | 6/1968 | Tantlinger et al. | ............. | 267/52 |
| 3,448,994 A | * | 6/1969 | King et al. | ........... | 280/124.106 |
| 3,935,915 A | * | 2/1976 | Seilly et al. | ................. | 177/136 |
| 4,220,349 A | * | 9/1980 | Gaussin | ...................... | 280/788 |
| 4,633,564 A | * | 1/1987 | Sauber | ...................... | 29/401.1 |
| 5,354,092 A | * | 10/1994 | Calvert | ........................ | 280/718 |
| 5,971,654 A | * | 10/1999 | Sweeney, Jr. | ............... | 403/400 |
| 6,223,865 B1 | * | 5/2001 | Lang et al. | .............. | 188/73.31 |
| 6,386,565 B1 | * | 5/2002 | Kugler | ................ | 280/124.165 |

OTHER PUBLICATIONS

Defintion of "aperture", from "your Dictionary.com", http://www.yourdictionary.com.*

* cited by examiner

*Primary Examiner*—Marc Jimenez
(74) *Attorney, Agent, or Firm*—Harness, Dickey & Pierce, P.L.C.

(57) ABSTRACT

A method of attaching an axle of a golf cart to a leaf spring of the golf cart, comprising the steps of aligning the leaf spring adjacent the axle and a bottom plate, inserting an end of a fastener initially through a first aperture associated with the axle and subsequently through a second aperture of the bottom plate and securing the leaf spring between the axle and the bottom plate by securing the fastener at the bottom plate, enabling improved access for assembly and service.

8 Claims, 3 Drawing Sheets

US 6,941,634 B2

METHOD FOR ATTACHING AXLES TO A LEAF SPRINGS ON HYDRAULIC DISC BRAKE VEHICLES

FIELD OF THE INVENTION

The present invention relates to a method for assembling a golf cart suspension and, more particularly, to a method for fastening an axle to a leaf spring to improve assembly and service operations.

BACKGROUND OF THE INVENTION

In a golf cart, it is common to incorporate a suspension system and a braking system on a common axle. Further, it is often necessary to locate the braking system and the suspension system in close proximity to one another along the body of the axle. It is essential that the brake system, suspension system and rear axle are all serviceable once assembled. Further, in designing such a system, it is desirable to provide for a quick and ergonomic installation process.

Wider golf carts that utilize a solid rear axle design in conjunction with a longitudinal leaf spring rear suspension require a configuration for attaching the axle to the leaf spring. Typically, these vehicles utilize U-bolts to clamp the leaf springs to the underside of a mounting plate fixed to a bottom of the axle. Threaded ends of the U-bolts are initially inserted over opposite sides of the leaf spring and are received up through the mounting plate and are secured by threaded nuts. Tightening of the nuts retains the leaf spring between the axle and the plate and thereby holds the leaf spring and axle in fixed contact. In this manner, the threaded ends of the U-bolts point upwards. This type of configuration works well for wide vehicles with drum brakes, but fails to accommodate narrower vehicles, specifically those with hydraulic disc brakes.

Narrow vehicles with hydraulic disc brakes require a much larger disc brake caliper in place of a typical drum brake traditionally found on a wider vehicle. The larger size of the disc brake caliper often results in reduced access to the U-bolts because of the calipers. The primary problem is that the caliper body blocks access to the nuts that secure the U-bolts tight, thereby hindering assembly, or service after assembly.

Therefore, it is desirable in the golf cart industry to provide a method of assembling a suspension for enabling improved access to the attachment mechanisms.

SUMMARY OF THE INVENTION

Accordingly, the present invention provides a method of attaching an axle of a golf cart to a leaf spring of the golf cart, comprising the steps of aligning the leaf spring adjacent the axle and a bottom plate, inserting an end of a fastener initially through a first aperture associated with the axle and subsequently through a second aperture of the bottom plate and securing the leaf spring between the axle and the bottom plate by securing the fastener at the bottom plate.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
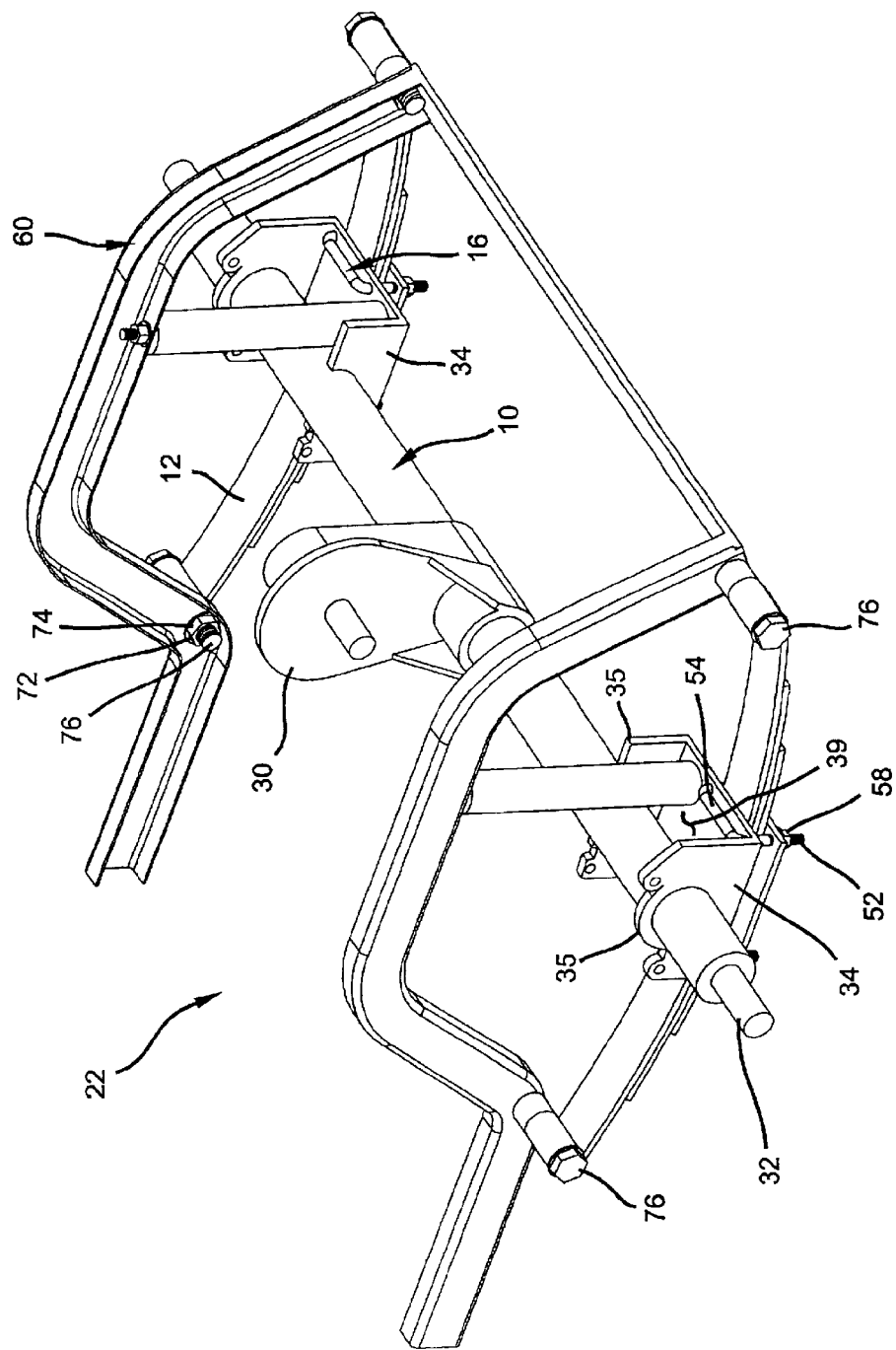
FIG. 1 is a perspective view of a golf cart suspension system assembled in accordance with the present invention.

The following description of the preferred embodiment is merely exemplary in nature and is in no way intended to limit the invention, its application, or uses. While the present invention is shown in an axle of a golf cart, it is not limited as such and may be used in other applications.

With reference to the figures, an apparatus and method of attaching an axle 10 of a golf cart to a leaf spring 12 of a golf cart is provided including, aligning the leaf spring 12 adjacent the axle 10 and a bottom plate 14, inserting an end 52 of a fastener 16 initially through apertures 18 associated with the axle 10 and subsequently through apertures 20 of the bottom plate 14, and securing the leaf spring 12 between the axle 10 and the bottom plate 14 by securing the fastener 16 at the bottom plate 14.

Figure 2:
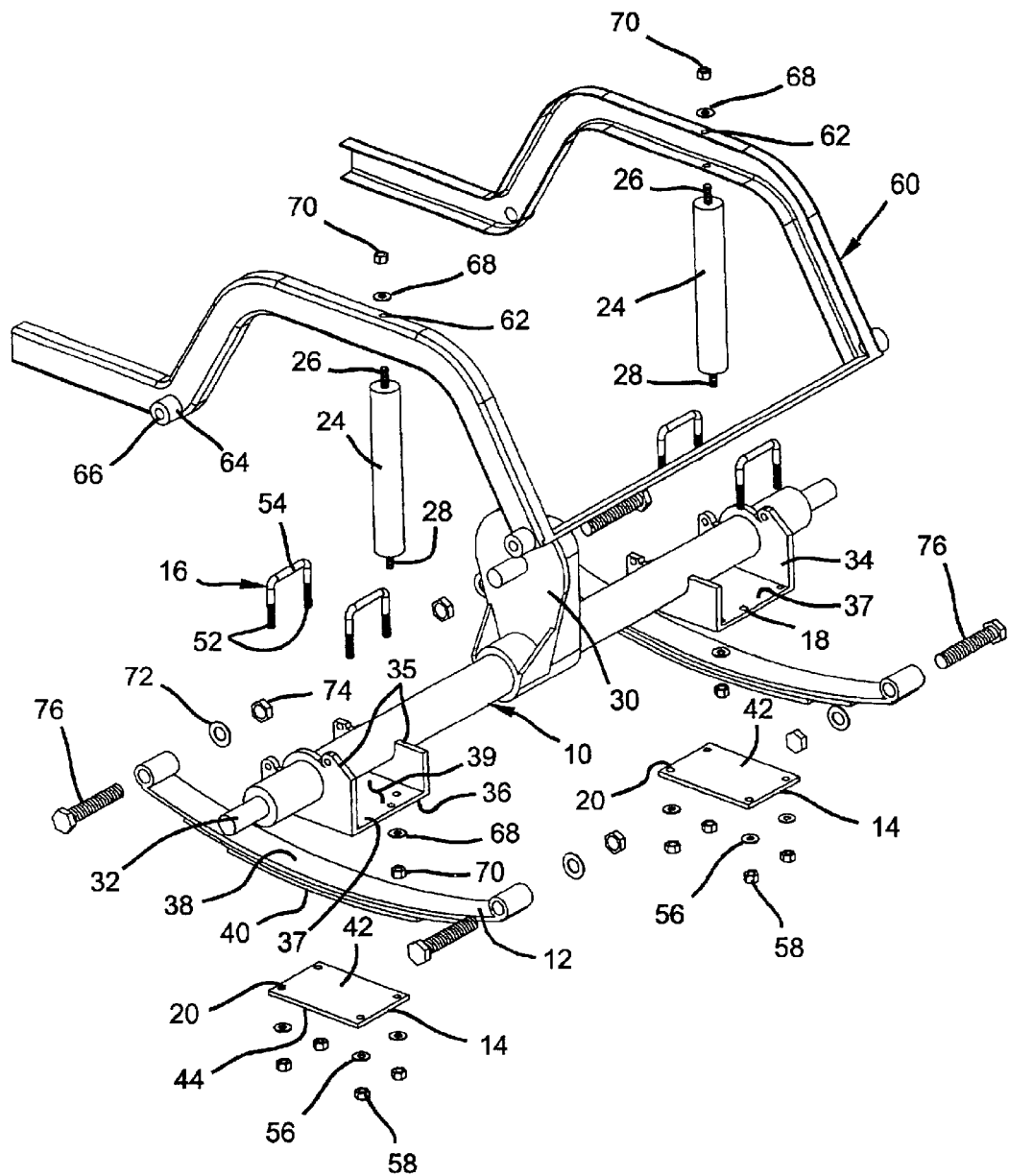
FIG. 2 is an exploded view of the golf cart suspension system of FIG. 1.

With reference to FIGS. 1 and 2, a golf cart suspension system 22 is shown including the solid axle 10 resiliently supported on a frame 60 by a pair of the leaf springs 12 and shock dampers 24 having first and second threaded attachment posts 26,28, respectively. The axle 10 includes a differential 30 operably attached thereto for driving drive shafts 32 rotatably supported within the axle 10. The drive shafts 32 are each operably attached to a wheel (not shown) for driving the wheel. Further, hydraulic disc brake assemblies (not shown) are associated with each wheel for selective braking thereof. In the preferred embodiment, the axle 10 includes a pair of mounting brackets 34, each having an engagement face 36 and the attachment apertures 18 formed therein. The mounting brackets 34 further include sidewalls 35 forming a trough area 39 and are welded or otherwise fixedly attached to the axle 10 by other suitable means. The leaf spring 12 is an elongate curved member, solid along its length, with first 38 and second 40 engagement faces. The bottom plate 14 is a flat body including first 42 and second 44 engagement faces and attachment apertures 20 formed therethrough.

The fasteners 16 include a threaded bolt with mating washers and threaded nuts. However, in the preferred embodiment, the fasteners include a U-bolt 16 having two threaded ends 52 interconnected by a cylindrical cross member 54. The U-bolt 16 is fastened by mating washers 56 and threaded nuts 58 whereby the threaded ends 52 are initially inserted into attachment apertures 18 in the mounting bracket 34 and subsequently through attachment apertures 20 in the bottom plate 14. The tightening of the mating nuts 58 interconnects the mounting bracket 34 and the bottom plate 14, retaining the leaf spring 12 therebetween. In addition, the frame 60 is provided for operably supporting the axle 10 and suspension system 22 through attachment of the shock dampers 24 and leaf springs 12, whereby the fame 60 includes attachment apertures 62 formed therethrough for receiving the first threaded attachment post 26 of each shock damper 24 and brackets 64 having attachment apertures 66 formed therethrough for attachment of the leaf springs 12 thereof. The first threaded attachment post 26 of each shock damper 24 is secured to the frame 60 by a mating washer 68 and threaded nut 70. Similarly, the second threaded attachment post 28 of each shock damper 24 is attached to the attachment aperture 18 of the mounting bracket 34 by mating washers 68 and threaded nuts 70. The leaf springs 12 are attached in a similar manner by utilizing threaded fasteners 76 with mating washers 72 and threaded nuts 74 for securing the leaf springs 12 to the attachment apertures 66 of the bracket 64.

In accordance with the method of the present invention, the leaf springs 12 are attached to the axle 10 by mechanically fastening the axle 10 to the bottom plate 14, for retaining the leaf spring 12 therebetween. The engagement face 36 of the mounting bracket 14 is brought into contact with the first engagement face 38 of the leaf spring 12. The second engagement face 40 of the leaf spring 12 is brought into contact with the first engagement face 42 of the bottom plate 14. The U-bolt 16 is initially inserted into the attachment apertures 18 of the mounting bracket 34 and subsequently through attachment apertures 20 of the bottom plate 14. The U-bolts 16 secure the leaf springs 12 between the first engagement face 42 of the bottom plate 14 and the engagement face 36 of the mounting bracket 34 by tightening the mating washers 56 and threaded nuts 58. The tightening of the nuts 58 draws the mounting bracket 34 and the bottom plate 14 closer together, retaining the leaf spring 12 therebetween.

Figure 3:
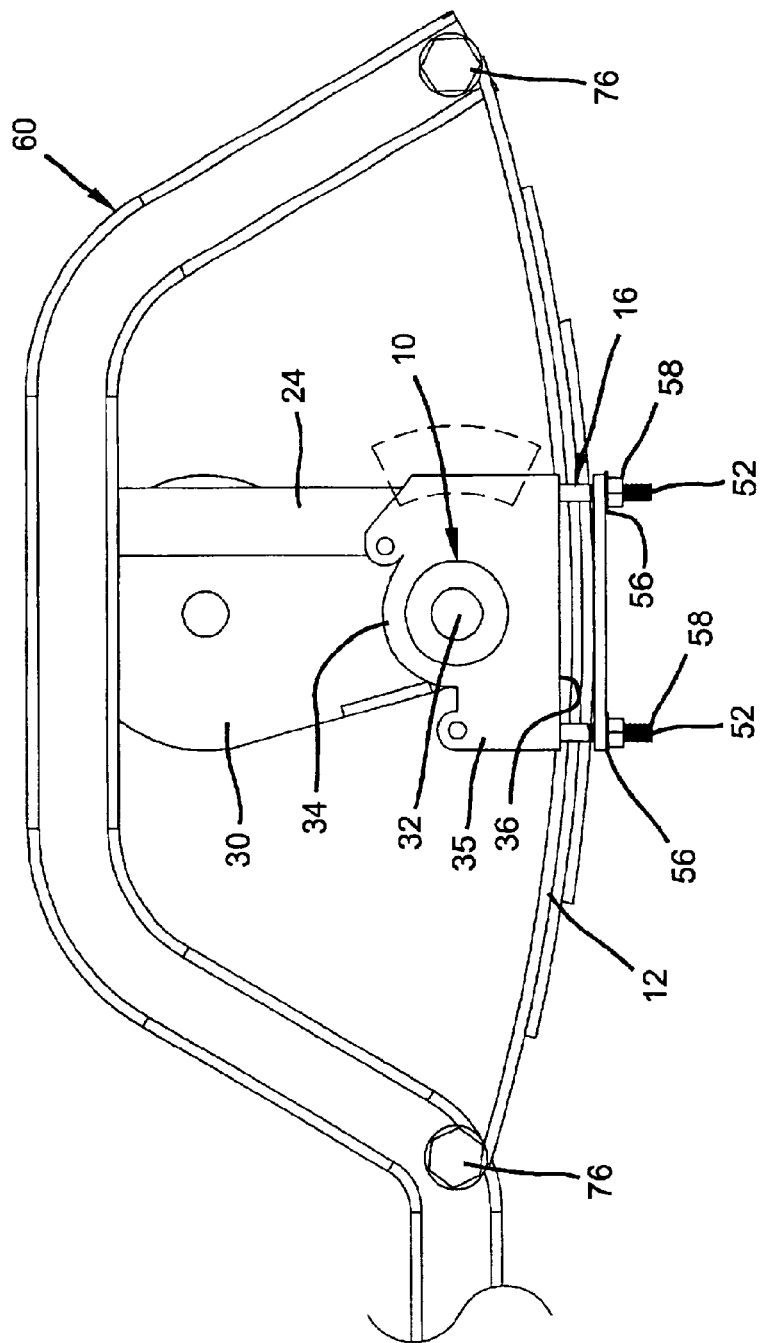
FIG. 3 is a side view of the golf cart suspension system of FIG. 1.

With particular reference to FIG. 3, calipers (shown in phantom) of the disc brake assemblies are generally offset from the mounting brackets 36, covering an area lateral to the mounting brackets. The location of the calipers hinders access to a top face 37 of the mounting brackets 36. The configuration of the present invention enables the threaded ends 52 of the U-bolt 16 to extend away from the second engagement face 44 of the bottom plate 14 thereby obviating the primary problem of the brake assembly blocking access to the nuts 58 which secure the U-bolts 16 tight. In this manner, improved access to the nuts 58 for assembly and service is enabled.

In an alternative embodiment, the mounting bracket 34 and the bottom plate 14 are interconnected by individual threaded fasteners (not shown) such as a bolt and are similarly tightened by mating washers and threaded nuts at the second engagement face 44 of the bottom plate 14. It is anticipated that other methods of fastening the mounting bracket 34 to the bottom plate 14 may be utilized, enabling selective attachment and detachment thereof and should be considered within the scope of the invention. Again, the threaded posts 52 of the individual fasteners 16 extend away from the second engagement face 44 of the bottom plate 14 enabling improved access for assembly and service.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of attaching an axle of a golf cart to a leaf spring of the golf cart, comprising the steps of:

inserting the axle through a support hole formed in a wall of a mounting bracket;

aligning the leaf spring beneath the axle and above a bottom plate;

inserting ends of a U-bolt initially through a first set of apertures associated with the mounting bracket and subsequently through a second set of apertures of the bottom plate, the U-bolt straddling the leaf spring and being inserted in a downward direction; and securing the leaf spring between the axle and the bottom plate by securing a fastener at the bottom plate.

2. The method of claim 1, wherein the mounting bracket includes a trough within which the first set of apertures are disposed.

3. The method of claim 1, further comprising the step of providing a third set of apertures associated with the mounting bracket and a fourth set of apertures associated with the bottom plate, wherein a second U-bolt simultaneously attaches the third set of apertures to the fourth set of apertures.

4. The method of claim 1, further comprising the step of providing mating washers and threaded nuts for securing the U-bolt at the bottom plate.

5. A method of attaching an axle of a golf cart, having a disc brake assembly disposed thereon, to a leaf spring of the golf cart, comprising the steps of;

inserting the axle through a support hole formed in a wall of a mounting bracket, the mounting bracket forming a trough;

aligning the leaf spring beneath the mounting bracket and above a bottom plate;

inserting threaded ends of a U-bolt initially through first and second apertures formed in the trough of the mounting bracket and subsequently through corresponding third and fourth apertures of the bottom plate, the threaded ends of the U-bolt straddling the leaf spring and being inserted in a downward direction generally away from an area blocked by the disc brake assembly; and securing the leaf spring between the axle and the bottom plate by securing the threaded ends of the U-bolt at the bottom plate with mating washers and threaded nuts.

6. The method of claim 5, further comprising the step of providing the mounting bracket with a fifth and seventh aperture and the bottom plate with a sixth and eighth aperture and further providing a second U-bolt for simultaneous attachment of the fifth and seventh apertures to the sixth and eighth apertures.

7. The method of claim 6, further comprising the step of securing the second U-bolt to the bottom plate.

8. The method of claim 6, further comprising the step of securing the second U-bolt with mating washers and threaded nuts.

* * * * *